Patented Apr. 6, 1948

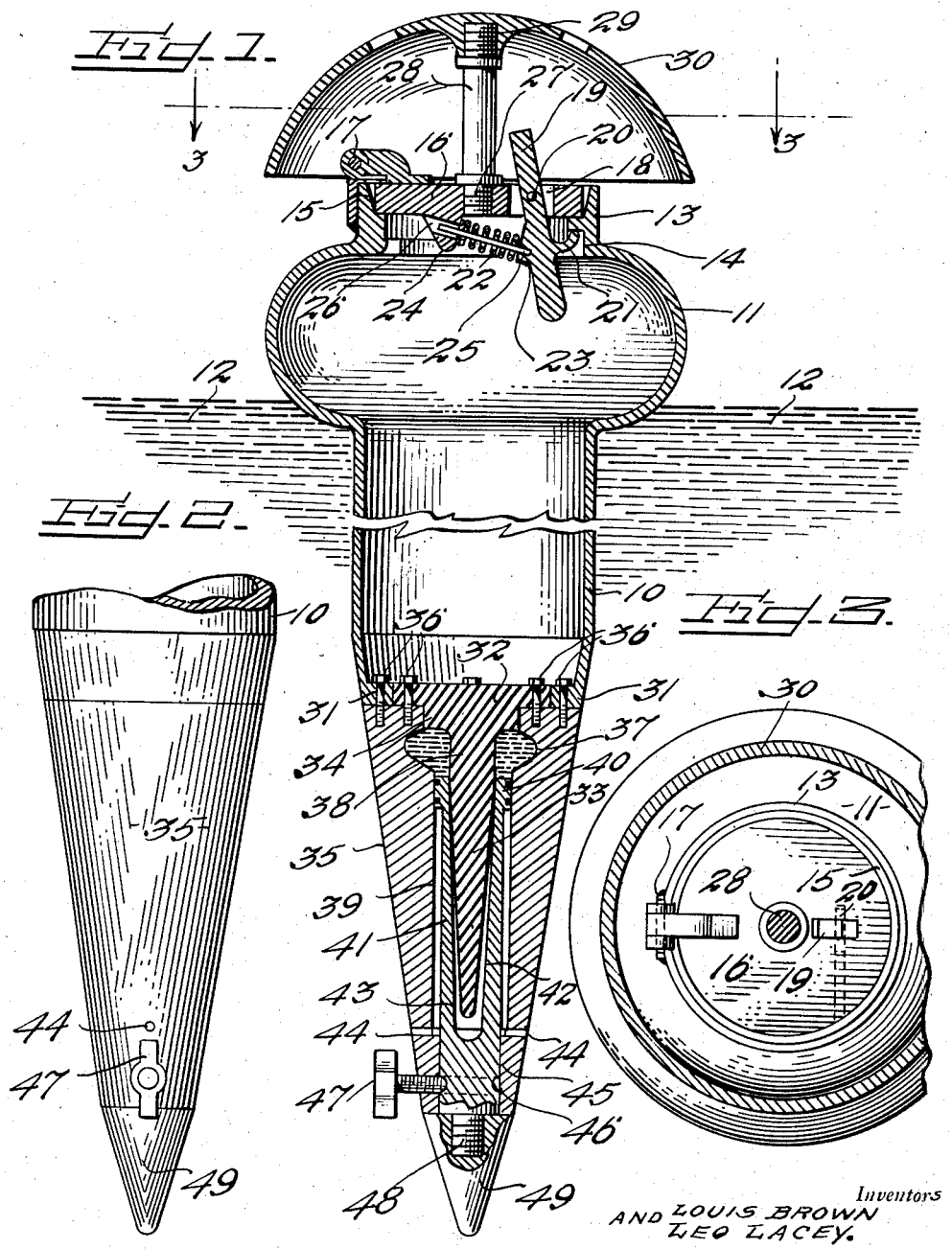

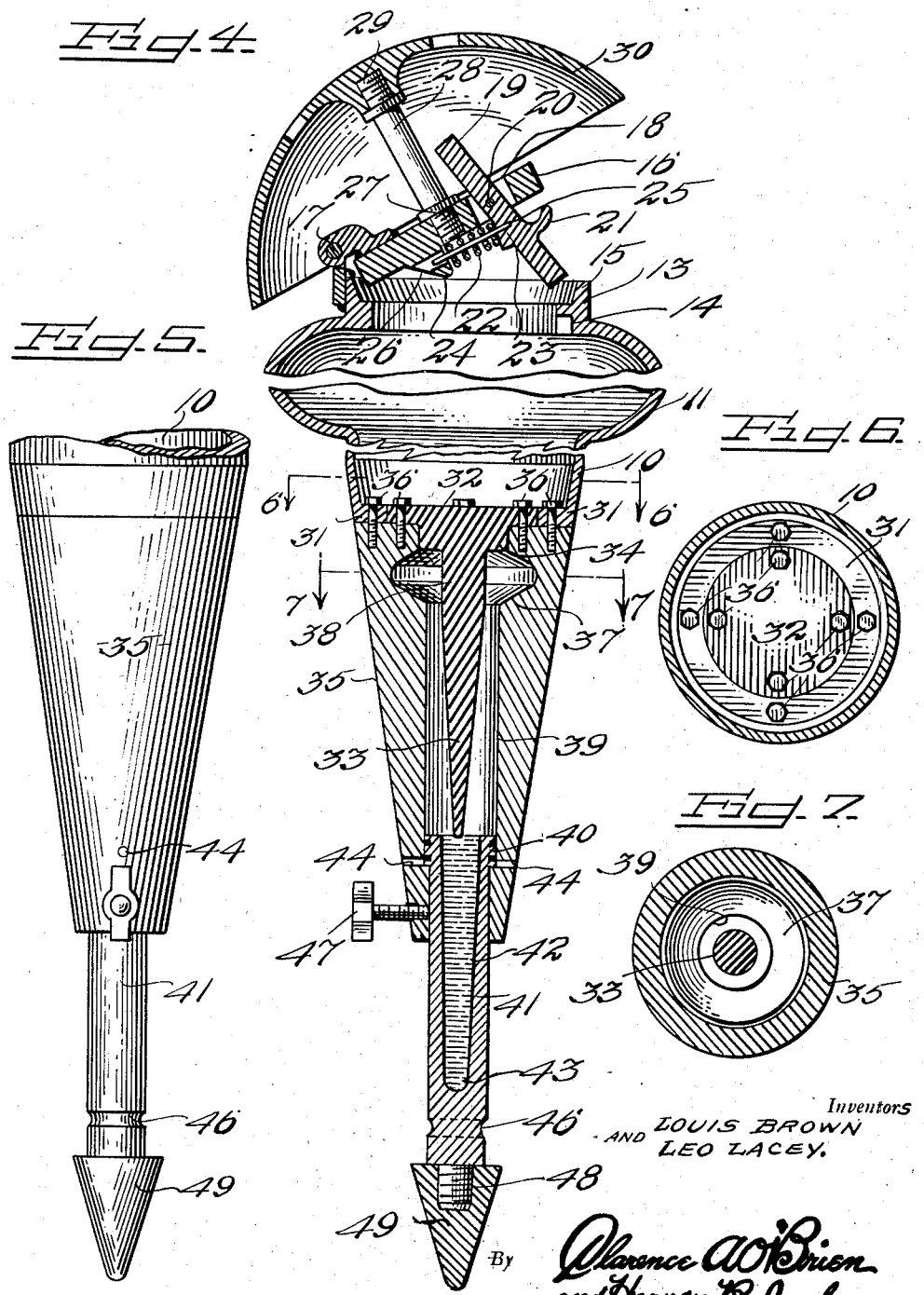

2,439,236

UNITED STATES PATENT OFFICE 2,439,236

CARRIER FOR AIRCRAFT DELIVERY

Louis Brown and Leo Lacey, Camp Wood, Tex.

Application January 17, 1946, Serial No. 641,724

13 Claims. (Cl. 244—138)

This invention relates to a carrier for airplane delivery, and has particular reference to a carrier, aerial landing buoy or safety aerial landing device for safely landing passengers, cargo or mail from an aircraft, such as an airplane, a balloon or any other means of air travel, while the aircraft is in flight.

The object of the invention is to provide a novel and simple construction of aerial landing carrier or buoy designed to safely land passengers, cargo or mail at any particular area or place governed by the air crew and without requiring the skill of trained men in the operation thereof.

Another object of the invention is to provide a carrier, which as distinguished from the conventional floating method, falls to the earth in such a manner that the velocity or speed thereof is not materially checked until contact is made with the earth or water, so that the path of descent during the flight thereof may be controlled. The device also provides means whereby passengers of an airship which can not land safely, can be safely landed in the emergency without intimate knowledge of the construction and operation of the device, since the control is entirely with the crew, thus eliminating any mistake that could be made if the safety in the landing depended upon any operation on a passenger's part.

Another object of the invention is to provide a novel carrier which can be released from an air ship over water or over land and safely land passengers or cargo speedily and in such a manner as to cushion the impact of landing only after striking the earth or water, which will remain upright when striking and partially penetrating the ground or earth, or float in water, and which employs a hydraulic or liquid cushion for this purpose, to check the fall of the carrier to a gradual stop.

Another object of the invention is to provide a carrier for landing purposes, which is provided with a hydraulic cushion, and which is entirely automatic in its action.

Other objects and advantages reside in the details of construction and operation as more fully hereinafter described and claimed, reference being had to the accompanying drawings forming part hereof, wherein like numerals refer to like parts throughout, and in which:

Figure 1 is a central longitudinal sectional view of a carrier constructed in accordance with the invention.

Figure 2 is a fragmentary elevation of the head end thereof, looking at right angles to the position shown in Figure 1.

Figure 3 is a sectional view taken on the line 3—3 of Figure 1,

Figure 4 is a sectional view similar to Figure 1, but showing the device positioned as when in use for landing, as distinguished from the position at the landing, shown in Figure 1.

Figure 5 is a fragmentary side elevation of the device at the head end, taken at right angles to Figure 4.

Figure 6 is a section view taken on line 6—6 of Figure 4, and

Figure 7 is a sectional view taken on the line 7—7 of Figure 4.

Referring to the drawings in detail, in which like reference characters designate corresponding parts throughout the several views, the carrier is shown as comprising a container or chamber 10 shown of cylindrical shape adapted to receive a passenger, cargo or mail and having formed on its upper end, an enlarged convex buoy section 11 forming a shoulder adapted to make impact with the earth in a cushioned landing or to rest upon the water, either of which is designated at 12. The enlarged portion 11 forms a chamber continuously with the container 10 in which the upper part of the body may be accommodated and is provided with a reduced neck portion 13 having a latch recess and shoulder 14 and an inclined beveled seat 15 at the top and inside thereof against which a trap door or closure 16 is designed to seat. This trap door is hinged as at 17 to the neck portion 13 and has a slot 18 therethrough at the side remote from the pivot to receive a catch 19 pivoted at 20 in the walls of said slot so as to project above and below the trap door or closure. The lower end has a catch 21 designed to cooperate with the recessed stop or keeper 14 and is normally pressed against the same by a spring 22 disposed between the latch lever 19 at an offset boss 23 thereof and a boss 24 projecting from the bottom of the trap door 16 with a stem 25 anchored in the boss 23 on which the spring 22 is mounted, with the other end of the stem 25 operating through an opening 26 in the boss 24 to allow pivotal movement of the latch lever 19. The lever is designed to automatically engage the keeper or shoulder 14 when the device is in a closed position, so as to hold it in this position, but may be released by pivoting the latch lever 19 against the action of the spring 22, to permit the trap door to be opened in a manner shown in Figure 4 of the drawings, but when closed, to seal the interior of the buoy against the entrance of water, when landing on water.

The trap door closure 16 is provided with a central threaded opening 27 to take a shouldered stem 28 at its lower end, the upper end being similarly formed to thread into a socket 29 in the central boss of a convex canopy 30 which is concaved at the bottom and convex on top, so as to slightly check the descent of the buoy. It also covers and protects the mechanism of the latch. The bottom of the container or chamber 10 is provided with an internal annular shoulder 31 designed to be closed by a plug or plate 32 having a depending tapered rod 33 below an enlarged upper portion 34 thereof depending from the plate 32 which closes the central circular opening in the flange 31. A tapered head or body 35 is secured to the flange 31 and plate 32 as indicated at 36, as by bolting through the same from within the container or chamber 10 and fits around the shoulder portion 34. Below the shoulder portion, the tapered body or head 35 is provided with an annular chamber 37 opening by a restricted annular passage around the upper cylindrical portion 38 of the tapered rod or plunger 33 into a cylinder 39 formed in the lower portion of the body 35. A piston or plunger 40 operates in this cylinder, 39, and has a suitable packing around the outside to render the same fluid-tight and this plunger has a reduced lower portion 41 provided with a tapered chamber 42 to receive the tapered depending rod, stem or plunger 33 in such a manner that a chamber 43 is formed around the same enlarging downwardly to a chamber or space between the lower small end of the tapered rod 33 and the bottom of the recess formed in the top of the plunger 40 and its portion 41, with an air vent or duct 44 at the bottom extending radially through the wall of the body or head 35, while the plunger portion 41 fits tight through a bore in the lower portion of the body or head 35 as indicated at 45 and is provided with an annular groove 46 designed to be engaged by a set screw 47 threaded through the wall of the body or head 35 so as to hold the plunger 40 inoperative when the device is set and not in use as shown in Figure 1. The lower end of the plunger is provided with a threaded stem or shank 48 which is engaged in a threaded socket in a spear head 49, the spear head and the tapered body 35 serving to guide the device in its descent when released while the canopy 30 keeps uppermost and the heavy end downward in a straight line flight or trajectory.

Normally, the buoy will right itself to a perpendicular position, straight up and down, with the spear head down facing the earth or water and the canopy at the top, the weight of the tapered head and spear head being sufficient to hold the device perpendicular and the canopy acting as an air trap to stabilize against air currents so that the flight can be hydraulically controlled and checked at any set distance to be safe with all operations automatic.

In operation, the thumb or set screw 47 engaging the groove 46 will hold the spear head 49 up against the tapered head or body 35 at its lower end although the spear head is tapered to a greater degree and the surfaces align peripherally. The trap door may be opened by releasing the latch to permit the canopy to swing to one side on the stem 23 to permit entry of a passenger or cargo and may be then closed. By releasing the screw 47, the plunger may be allowed to move downwardly in the cylinder 39, but normally, with the fluid in the annular chamber 37, the spear head is allowed to drop, when the fluid will escape into the chamber 42 as shown in Figure 4 of the drawings. The device being released through a trap door or hatch of an airship, the device will descend in a vertical position against the air currents and as the device makes contact with the earth or water, the displacement of the water or other liquid will act against the displacement or impact of the spear head and of the tapered plunger or rod 33 against the fluid and of the upward movement of the plunger, to cushion the latter to check the velocity of the fall, bringing the device to a stop. The fluid will slowly escape through the communicating passage between the cylinder 39 and the chamber 37, to enter the same as shown in Figure 1 of the drawings. This will safely bring the device to a stop by cushioning and gradually checking the descent or velocity of the fall, without injury to the passengers or cargo and at any desired distance. On water, the device will act as a buoy or float and the entry of the water into the chamber in which the passenger or cargo is placed, will be prevented. When the device is released from an airship on land, the weight of the spear head and body, will cause the spear head to drop and lower the plunger 40 in the cylinder 39 to move the piston or plunger downwardly, as shown in Figure 4, with the head of the plunger or piston at the bottom of the cylinder and the fluid in the head chamber 37 flowing to the bottom of the cylinder beneath and around the tapered rod 33. Thus, when contact is made with the earth, the spear head and shaft or plunger will move upwardly and is designed to withstand the shock of being stopped instantly, but the canopy 30 will partially check the descent of the buoy or velocity thereof, after which the tapered body 35 moves downwardly over the piston or plunger and the tapered rod 33 entering the fluid, will further cushion the downward movement and cause displacement of the fluid upwardly into the chamber 37 gradually in such a manner as to effectively cushion the downward movement as the tapered rod enlarges upwardly and restricts the annular space around the same within the cylinder, causing a constant increase in pounds of pressure resisting further downward movement of the buoy and of the fluid upwardly into the chamber 37 to further effectively check the velocity and the speed of the descending buoy to automatically check the latter to a time when it is stopped by the tapered head being engaged with the shoulder at the lower end of the body 35 and the top of the spear head 49. In this manner, the passengers or crew may be landed in an emergency by an airship which can not safely land, without requiring any knowledge of the operation on the part of the passengers. The device is of simple construction, durable, easy to manufacture and effective in operation.

While in the foregoing there has been shown and described the preferred embodiment of this invention it is to be understood that minor changes in the details of construction, combination and arrangement of parts may be resorted to without departing from the spirit and scope of the invention as claimed.

What we claim is:

1. A carrier for aircraft delivery including a chamber having an upper buoy portion, a closure for the top of said portion and a canopy mounted on said closure, said closure having releasable means for holding the same closed, and hydraulic cushioning means at the lower end of the body.

2. A carrier for aircraft delivery including a chamber having an upper buoy portion, a closure for the top of said portion and a canopy mounted on said closure, said closure having releasable means for holding the same closed, said closure being hinged to pivot to one side with the canopy when the closure is open to permit entrance of a passenger or cargo and sealed when closed, and hydraulic cushioning means at the lower end of the body including a movable spear head.

3. A carrier for aircraft delivery including a body having a chamber and a buoy of enlarged formation at the top, a closure therefor, means for releasably holding the closure in closed position and permitting the same to be opened, a canopy on said closure and movable therewith, a plunger in the lower end of the body and sealed off from the chamber, means for cushioning the movement of said plunger within the body, and a spear head at the lower end of the plunger.

4. A carrier for aircraft delivery comprising a container having an enlarged convex buoy portion at the top, a closure therefor, means to hold said closure in a closed position, a concavo-convex canopy supported above the closure, a downwardly tapering rod at the lower end of the container, a tapered body secured to the lower end of the container and having a cylinder surrounding the rod with an enlarged upper portion, a plunger movable in said cylinder and having its lower portion reduced and spaced from the wall of the cylinder, a spear head secured to the lower end of the plunger, said plunger having a chamber therein receiving said tapered rod snugly in its upper portion and in spaced relation to the lower end thereof when the plunger is upwardly displaced with the spear head against the lower end of the tapered body, an air duct leading from the cylinder at the lower end thereof, and means for holding the plunger upwardly displaced.

5. A carrier for aircraft delivery comprising a container having an enlarged convex buoy portion at the top, a closure therefor, means to hold said closure in a closed position, a concavo-convex canopy supported above the closure, a downwardly tapering rod at the lower end of the container, a tapered body secured to the lower end of the chamber and having a cylinder surrounding the rod with an enlarged upper portion, a plunger movable in said cylinder and having its lower portion reduced and spaced from the wall of the cylinder, a spear head secured to the lower end of the plunger, said plunger having a downwardly tapered chamber therein open at the top and receiving said tapered rod in spaced relation to the lower end thereof when the plunger is upwardly displaced with the spear head against the lower end of the tapered body, an air duct leading from the cylinder at the lower end thereof, said cylinder having an enlarged upper portion adapted to receive a liquid designed to flow downwardly into the cylinder beneath the tapered rod in the chamber below and around the same when the plunger is downwardly displaced with the spear head and to cushion the upward movement of the plunger and downward movement of the container and body upon impact with water or earth to cushion the landing of the container, and means to hold the spear head and plunger upwardly displaced.

6. A carrier for aircraft delivery including a chamber having a top closure and a large buoy portion adapted to float in water, a canopy on the closure, a depending tapered rod rigid with and extending below the chamber, the rod having a top enlargement to seal the lower end of the chamber, a tapered body also secured to the chamber around the tapered rod and having a cylinder therein with an enlarged upper portion communicating with the cylinder to receive fluid therein and an air duct at the bottom of the cylinder through the wall of the body, a plunger movable in the cylinder and having a reduced lower portion spaced from the wall of the cylinder, and snugly fitting and movable through the lower portion of the body, said plunger having an interior chamber adapted to receive the tapered rod and fluid therein around and below the rod, said rod having a cylindrical upper portion to close said chamber at the top of the plunger and retain the fluid in the upper enlarged portion of the cylinder into which it is forced around the rod from the plunger chamber when the plunger is upwardly displaced, said plunger when moving downwardly permitting the fluid to enter the lower portion of the plunger chamber around the tapered rod and into the upper enlarged portion of the cylinder to cushion the upward movement of the plunger upon impact in landing, a spear head on the lower portion of the plunger, the lower portion of the plunger having a groove therein, and a thumb screw operating through the head and engaging said groove to hold the plunger upwardly when not in use.

7. An aerial landing buoy including a body having a chamber and a buoy of enlarged formation at the top adapted to float in water, a closure therefor, means for releasably holding the closure in closed position permitting the same to be opened from the inside or outside, a canopy on said closure and movable therewith to an open position and over the closure when in a closed position.

8. An aerial landing buoy including a body having a chamber and a buoy of enlarged formation at the top adapted to float in water, a closure therefor, means for releasably holding the closure in closed position permitting the same to be opened from the inside or outside, a canopy on said closure and movable therewith to an open position and over the closure when in a closed position, and means at the lower end of the body for cushioning the same on impact with the earth or water.

9. A safety aerial landing device including a chamber having an upper enlarged buoy portion adapted to float in water, and forming a bottom shoulder therewith, said body having a reduced top neck portion, a closure hinged thereto at one side and adapted to swing to an open position, a canopy supported on the closure and covering the same to check the speed of the device in flight and cause the same to remain upright, a latch recess in the neck, a spring latch cooperating with said recess and carried by the closure to hold the latter in closed position and extending inwardly and outwardly of the closure to release the same from the inside or outside of the chamber, and a tapered spear head on the lower portion of the body having means to cushion the impact thereof with the earth or water.

10. A safety aerial landing device comprising a container having an enlarged convex buoy portion at the top adapted to float in water, a closure therefor, a canopy supported by the closure and covering the same, a downwardly tapering rod at the lower end of the container, a tapered body secured to the lower end of the container and having a cylinder surrounding the rod with an enlarged upper portion, a plunger movable in said cylinder and having its lower portion reduced and spaced from the wall of the cylinder, a spear head secured to the lower end of the plunger, said plunger having a chamber therein receiving said tapered rod snugly in its upper portion and in spaced relation to the lower end thereof when the plunger is upwardly displaced with the spearhead against the lower end of the tapered body, an air duct leading from the cylinder at the lower end thereof, and means for holding the plunger upwardly displaced.

11. A safety aerial landing device comprising a body having a chamber with a top closure forming a container and means carried by the closure to check the descent of the body, a downwardly tapering rod at the lower end of the container, a tapered body secured to the lower end of the container and having a cylinder surrounding the rod with an enlarged upper portion, a plunger movable in said cylinder and having its lower portion reduced and spaced from the wall of the cylinder, a spear head secured to the lower end of the plunger, said plunger having a chamber therein receiving said tapered rod snugly in its upper portion and in spaced relation to the lower end thereof when the plunger is upwardly displaced with the spear head against the lower end of the tapered body, an air duct leading from the cylinder at the lower end thereof, and means for holding the plunger upwardly displaced.

12. A safety aerial landing device comprising a container, a downwardly tapering rod at the lower end of the container, a tapered body secured to the lower end of the chamber and having a cylinder surrounding the rod with an enlarged upper portion, a plunger movable in said cylinder and having its lower portion reduced and spaced from the wall of the cylinder, a spear head secured to the lower end of the plunger, said plunger having a downwardly tapered chamber therein open at the top and receiving said tapered rod in spaced relation to the lower end thereof when the plunger is upwardly displaced with the spear head against the lower end of the tapered body, an air duct leading from the cylinder at the lower end thereof, said cylinder at its enlarged upper portion adapted to receive a liquid designed to flow downwardly into the cylinder beneath the tapered rod in the chamber below and around the same when the plunger is downwardly displaced with the spear head and to cushion the upward movement of the plunger and downward movement of the container and body upon impact with water or earth to cushion the landing of the container, and means to hold the spear head and plunger upwardly displaced.

13. A safety aerial landing device including a chamber having a top closure, a depending tapered rod rigid with and extending below the chamber, the rod having a top enlargement to seal the lower end of the chamber, a tapered body also secured to the chamber around the tapered rod and having cylinder therein with an enlarged upper portion communicating with the cylinder to receive fluid therein and an air duct at the bottom of the cylinder through the wall of the body, a plunger movable in the cylinder and having a reduced lower portion spaced from the wall of the cylinder, and snugly fitting and movable through the lower portion of the body, said plunger having an interior chamber adapted to receive the tapered rod and fluid therein around and below the rod, said rod having a cylindrical upper portion to close said chamber at the top of the plunger and retain the fluid in the upper enlarged portion of the cylinder into which it is forced around the rod from the plunger chamber when the plunger is upwardly displaced, said plunger when moving downwardly permitting the fluid to enter the lower portion of the plunger chamber around the tapered rod and into the upper enlarged portion of the cylinder to cushion the upward movement of the plunger upon impact in landing, a spear head on the lower portion of the plunger, the lower portion of the plunger having a groove therein, and a thumb screw operating through the head and engaging said groove to hold the plunger upwardly when not in use.

LOUIS BROWN.
LEO LACEY.

REFERENCES CITED

The following references are of record in the file of this patent:

UNITED STATES PATENTS

| Number | Name | Date |
|---|---|---|
| 1,768,194 | Donnell | June 24, 1930 |
| 2,151,395 | Smith | Mar. 21, 1939 |

FOREIGN PATENTS

| Number | Country | Date |
|---|---|---|
| 428,895 | France | July 3, 1911 |
| 442,973 | Great Britain | Feb. 19, 1936 |